(12) United States Patent
Tsotsis et al.

(10) Patent No.: US 9,700,747 B2
(45) Date of Patent: Jul. 11, 2017

(54) CATALYTIC REMOVAL OF GAS PHASE CONTAMINANTS

(71) Applicants: UNIVERSITY OF SOUTHERN CALIFORNIA, Los Angeles, CA (US); GC ENVIRONMENTAL, Anaheim, CA (US)

(72) Inventors: Theodore T. Tsotsis, Huntington Beach, CA (US); Fokion Egolfopoulos, Los Angeles, CA (US); Nitin Nair, Los Angeles, CA (US); Richard Prosser, Anaheim, CA (US); Jyh-Yih Ren, Anaheim, CA (US); Alireza Divsalar, Los Angeles, CA (US); Mirmohammadyousef Motamedhashemi, Los Angeles, CA (US); Majid Monji, Los Angeles, CA (US)

(*) Notice: Subject to any disclaimer, the term of this patent is extended or adjusted under 35 U.S.C. 154(b) by 284 days.

(21) Appl. No.: 14/216,089

(22) Filed: Mar. 17, 2014

(65) Prior Publication Data

US 2014/0271419 A1  Sep. 18, 2014

Related U.S. Application Data

(60) Provisional application No. 61/798,829, filed on Mar. 15, 2013.

(51) Int. Cl.
  *B01D 53/02*    (2006.01)
  *A62D 3/38*     (2007.01)
  (Continued)

(52) U.S. Cl.
  CPC ............... *A62D 3/38* (2013.01); *B01D 53/75* (2013.01); *B01D 53/8687* (2013.01);
  (Continued)

(58) Field of Classification Search
  None
  See application file for complete search history.

(56) References Cited

U.S. PATENT DOCUMENTS

| | | | |
|---|---|---|---|
| 5,240,472 A * | 8/1993 | Sircar | B01D 53/229 95/120 |
| 2004/0076575 A1* | 4/2004 | Alvarez, Jr. | A23L 2/54 423/437.1 |

(Continued)

OTHER PUBLICATIONS

Brinkmann, M. et al. 2001. Room-Temperature Synthesis of a-SiO2 Thin Films by UV-Assisted Ozonlysis of a Polymer Precursor. Chem.Mater., vol. 13, No. 3, pp. 967-972.

(Continued)

*Primary Examiner* — Anita Nassiri Motlagh
(74) *Attorney, Agent, or Firm* — McDermott Will & Emery LLP

(57) ABSTRACT

Systems and methods for removal of gas phase contaminants may utilize catalytic oxidation. For example, a method may include passing a gas that includes a gas phase contaminant through a catalytic membrane reactor at a temperature of about 150° C. to about 300° C., wherein the catalytic membrane reactor includes a bundle of tubular inorganic membranes, wherein each of the tubular inorganic membranes comprise a macroporous tubular substrate with an oxidative catalyst and a microporous layer disposed on a bore side of the macroporous tubular substrate, and wherein at least about 50% of the gas flows through the tubular inorganic membranes in a Knudsen flow regime; and oxidizing at least some of the gas phase contaminant with the oxidative catalyst layer, thereby reducing a concentration of the gas phase contaminant in the gas.

11 Claims, 5 Drawing Sheets

(51) Int. Cl.
 B01D 53/75 (2006.01)
 B01D 53/86 (2006.01)
 C10L 3/10 (2006.01)
(52) U.S. Cl.
 CPC ...... *C10L 3/101* (2013.01); *B01D 2255/1021* (2013.01); *B01D 2255/1023* (2013.01); *B01D 2255/1025* (2013.01); *B01D 2255/2073* (2013.01); *B01D 2255/2092* (2013.01); *B01D 2255/20715* (2013.01); *B01D 2255/20723* (2013.01); *B01D 2255/20761* (2013.01); *B01D 2255/20784* (2013.01); *B01D 2256/245* (2013.01); *B01D 2257/702* (2013.01); *B01D 2257/708* (2013.01); *B01D 2257/93* (2013.01); *B01D 2258/06* (2013.01); *B01D 2259/4583* (2013.01); *Y02E 50/346* (2013.01)

(56) References Cited

U.S. PATENT DOCUMENTS

| | | | | |
|---|---|---|---|---|
| 2006/0248800 | A1* | 11/2006 | Miglin | B01B 1/005 48/198.7 |
| 2007/0095205 | A1* | 5/2007 | Palumbo | B01D 53/047 95/51 |
| 2011/0052466 | A1* | 3/2011 | Liu | B01D 53/228 423/230 |

OTHER PUBLICATIONS

Dalton, J.C. 1985. Organic Photochemistry, ed. Padwa A., Dekker M., New York, vol. 7, Ch. 3, "Silane Photochemistry," pp. 149-230.
Jalali, A. et al. 2013. A Fundamental Study of Siloxane Decomposition during Combustion of Simulated Renewable Natural Gas. Combustion Science and Technology, vol. 185, No. 6, pp. 953-974.
Kockarts, G. 1976. Absorption and Photodissociation in the Schumann-Runge Bands of Molecular Oxygen in the Terrestrial Atmosphere. Planetary Space Science, vol. 24, pp. 589-604.
Lee, H.-C. et al. 2013. Use of Steam Activation as a Post-Treatment Technique in the Preparation of Carbon Molecular-Sieve Membranes. Industrial & Engineering Chemistry Research, vol. 52, pp. 1122-1132.
Motamedhashemi, M.M.Y. 2012. A Flow-Through Membrane Reactor for the Destruction of a Chemical Warfare Simulant. PhD Thesis, University of Southern California, Los Angeles, CA, Dec. 2012, 273 pages.
Motamedhashemi, M.M.Y. et al. 2011. Application of a Flow-Through Catalytic Membrane Reactor (FTCMR) for the Destruction of a Chemical Warfare Simulant. Journal of Membrane Science, vol. 376, pp. 119-131.
Motamedhashemi, M.M.Y. et al. 2015. A Hybrid Catalytic Membrane Reactor for Destruction of a Chemical Warfare Simulant. Journal of Membrane Science, vol. 473, pp. 1-7.
Nair, N. 2013. Novel Methods for Landfill Gas and Biogas Cleanup. Ph.D. Thesis, University of Southern California, Los Angeles, CA, Aug. 2013, 246 pages.
Nair, N. et al. 2011. UV Photodecomposition of Siloxanes. Global Waste Management Symposium, San Antonio, TX., 2011.
Ouchi, A. et al. 1999. UV-Laser-Induced Photolysis of Trimethyl(vinyloxy)silane for Chemical Vapor Deposition of Polysiloxane Films. Applied Organometallic Chemistry, vol. 13, pp. 643-647.
Ouyang, M. et al. 2000. Conversion of Some Siloxane Polymers to Silicon Oxide by UV/Ozone photochemical Processes. Chem. Mater., vol. 12, pp. 1591-1596.
Picasso, G. et al. 2003. Total Combustion of Methyl-Ethyl Ketone Over Fe2O3 based Catalytic Membrane Reactors. Applied Catalysis B: Environmental, vol. 46, pp. 133-143.
Pina, M.P., et al. 1996. The Knudsen-Diffusion Catalytic Membrane Reactor: An Efficient Contactor for the Combustion of Volatile Organic Compounds. Applied Catalysis B: Environmental, vol. 11, pp. L19-L27.
Pina, M.P. et al. 1997. Combustion of Volatile Organic Compounds Over Platinum-Based Catalytic Membranes. Industrial & Engineering Chemistry Research, vol. 36, No. 11, pp. 4557-4566.
Pola, J. et al. 2002. UV Laser Photolysis of Disiloxanes for Chemical Vapor Deposition of Nano-Textured Silicones. Chem. Mater., vol. 14, pp. 144-153.
Tsotsis, T. et al. 2011. Flow-through Catalytic Membrane Reactors (FTCMR) for Environmental and Other Applications. Plenary Talk presented at 10th International Conference on Catalysis in Membrane Reactors, Saint-Petersburg, Russia, Jun. 2011. Extended Abstract Published in the Meeting Proceedings.
Urbanova, M. 2001. IR Laser-Induced Thermolysis and UV Laser-Induced Photolysis of 1,3-Diethyldisiloxane: Chemical Vapor Deposition of Nanotextured Hydridoalkylsilicones. Journal of Materials Chemistry, vol. 11, pp. 1557-1562.

* cited by examiner

CATALYTIC REMOVAL OF GAS PHASE CONTAMINANTS

CROSS-REFERENCE TO RELATED APPLICATION

This application is based upon and claims priority to U.S. provisional patent application 61/798,829, entitled "Reactive Separation Approach for the Removal of Non-Methane Organic Compounds from Landfill Gas and Biogas," filed Mar. 15, 2013. The entire content of each of these applications and patents is incorporated herein by reference.

STATEMENT REGARDING FEDERALLY SPONSORED RESEARCH

This invention was made with Government support under Grant No. CBET-0968159, awarded by the National Science Foundation and Grant No. HDTRA1-10-1-0010, awarded by the Defense Threat Reduction Agency. The Government has certain rights in the invention.

BACKGROUND

1. Technical Field

This disclosure relates to removing contaminants from a gas.

2. Description of Related Art

There are many instances from industrial processes to counterterrorism where a gas includes gas phase contaminants that need to be removed. Commonly used methods to remove such contaminants include adsorption beds.

For example, landfill gas (LFG) and biogas are important renewable fuels as they contain more than 50% methane. LFG is a product of the biodegradation of waste materials deposited in landfills. Biogas may be produced from a variety of sources including the biodegradation in digesters of sludge from waste water treatment plants (WWTP). Typically, LFG and biogas include numerous trace contaminants, which are often referred to as non-methane organic compounds (NMOC). In some instances, the NMOC in LFG and biogas may contain halogens and sulfur. When these fuels are combusted to generate energy (e.g., in an engine or a turbine), the halogens and sulfur may produce acids that corrode the equipment and contribute to pollution (e.g., acid rain). Another class of NMOC is siloxanes, which contain in their structure silicon. When combusted, siloxanes may produce silica microparticles. In the energy producing equipment, the silica microparticles may coat the internal surfaces of the equipment. When the microparticles escape in the flue-gas, the particulate emissions may be both an environmental and health hazard.

One method for removing NMOC from LFG or biogas is to dehumidify the gas, remove the hydrogen sulfide, and then use active carbon (AC) beds to remove the NMOC. However, this method may not be particularly selective to NMOC that include halogens, sulfur, or silicon. Rather, the method typically removes most NMOC including aromatic compounds that may be harmless in energy producing equipment. Therefore, the AC beds may saturate more quickly, which gives rise to frequent regeneration cycles of the beds to mitigate breakthrough of the NMOC that are harmful in the energy producing equipment. Additionally, because the AC beds rely primarily on adsorption, during regeneration the NMOC are desorbed. The desorbed NMOC may then be flared, which produces air pollution and wastes fuel in the flaring process.

In another example, chemical warfare agents (CWA) may be dispersed in an air supply. As with the removal of NMOC from LFG, some methods for CWA removal may use adsorption with AC beds. In this example, because CWA are typically potent at low concentrations, the air may need to be purified to very low levels of CWA. However, AC beds rely on physisorption for removal of gas phase contaminants, which is highly concentration-dependent. Therefore, in some instances, the necessary level of air purity may be difficult to attain. Also, other components in the air like volatile organic compounds (VOC) and water may also adsorb in the AC beds, which reduces the capacity for CWA adsorption. Additionally, because the gas phase contaminant being removed is a CWA, the AC beds must be disposed of (which presents exposure issues) and be replaced, which makes the methods and systems discontinuous and more labor and equipment intensive to operate.

SUMMARY

The present application relates to systems and methods for catalytic removal of gas phase contaminants.

Some embodiments described herein may include a method that includes passing a gas that includes a gas phase contaminant through a catalytic membrane reactor at a temperature of about 150° C. to about 300° C., wherein the catalytic membrane reactor includes a bundle of tubular inorganic membranes, wherein each of the tubular inorganic membranes comprise a macroporous tubular substrate with an oxidative catalyst and a microporous layer disposed on a bore side of the macroporous tubular substrate, and wherein at least about 50% of the gas flows through the tubular inorganic membranes in a Knudsen flow regime; and oxidizing at least some of the gas phase contaminant with the oxidative catalyst layer, thereby reducing a concentration of the gas phase contaminant in the gas.

Some embodiments described herein may include a system that includes a catalytic membrane reactor comprising a heating element in thermal communication with a bundle of tubular inorganic membranes and a housing having a gas inlet and a gas outlet and containing the bundle of tubular inorganic membranes, wherein the catalytic membrane reactor is configured such that a gas can flow into the housing through the gas inlet, into a bore of the tubular inorganic membranes, through a wall of the tubular inorganic membranes, and out of the housing through the gas outlet, wherein each of the tubular inorganic membranes comprise a macroporous tubular substrate with an oxidative catalyst and a microporous layer disposed on a bore side of the macroporous tubular substrate.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

The present application relates to systems and methods for catalytic removal of gas phase contaminants. The systems and methods described herein may utilize an oxidative catalyst to oxidize gas phase contaminants like in NMOC and CWA, thereby converting the gas phase contaminants to other chemicals that may be more environmentally benign. Additionally, because the removal of the gas phase contaminants is catalytic in nature, the saturation may not be an issue as is the case with adsorption beds (e.g., AC beds). As such, the systems and methods may be utilized in a continuous fashion for longer periods of time.

Figure 1:
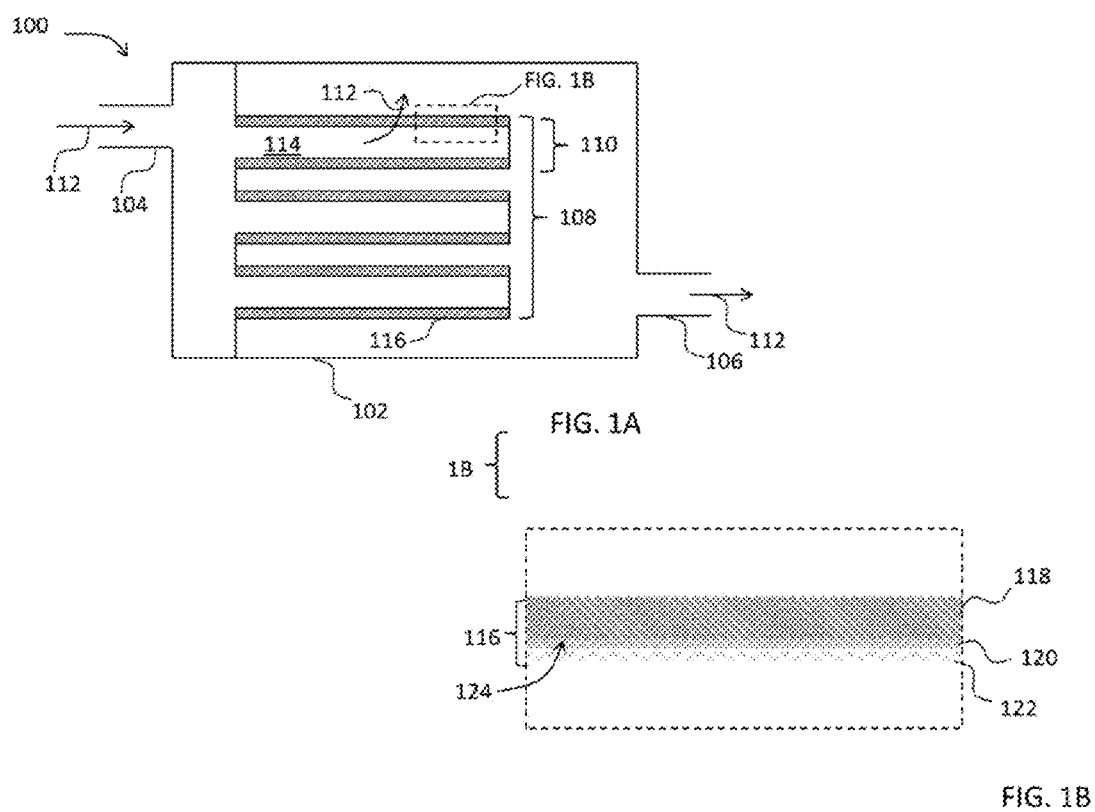
FIG. 1A illustrates a cross-sectional diagram of a catalytic membrane reactor suitable for catalytic removal of gas phase contaminants according to at least some embodiments described herein.
FIG. 1B illustrates an enlarged view a cross-section diagram of the wall of the tubular inorganic membrane of FIG. 1A according to at least some embodiments described herein.

FIG. 1A illustrates a cross-sectional diagram of a catalytic membrane reactor 100 suitable for catalytic removal of gas phase contaminants according to at least some embodiments described herein. The catalytic membrane reactor 100 includes a housing 102 having a gas inlet 104 and a gas outlet 106 and containing a bundle 108 of tubular inorganic membranes 110. The catalytic membrane reactor 100 may also include a heating element (not shown) in thermal communication with the bundle 108 of tubular inorganic membranes 110. In some embodiments, during operation, a gas 112 may flow through the gas inlet 104 and into the bores 114 of the tubular inorganic membranes 110. The gas 112 may then flow through the walls 116 of the tubular inorganic membranes 110 and to the gas outlet 112.

FIG. 1B illustrates an enlarged view a cross-section diagram of the wall 116 of the tubular inorganic membrane 110 of FIG. 1A according to at least some embodiments described herein. As illustrated, the tubular inorganic membrane is asymmetric with a macroporous tubular substrate 118 having an oxidative catalyst layer 120 and a microporous layer 122 disposed on a bore side 124 of the macroporous tubular substrate 112. As illustrated, the oxidative catalyst layer 120 is disposed between the microporous layer 122 and the macroporous tubular substrate 112.

One skilled in the art would recognize the plurality of configurations and alternatives for a catalytic membrane reactor or portions thereof that may be useful in achieving catalytic oxidation of gas phase contaminants. For example, in alternative embodiments (not shown), the oxidative catalyst may be impregnated in a microporous layer disposed on the bore side of the macroporous tubular substrate. In another example, in alternative embodiments (not shown), the oxidative catalyst may be impregnated in a microporous layer deposited on the top of one or more intermediate layers disposed on the bore side of the macroporous tubular substrate. In another example, in alternative embodiments (not shown), the oxidative catalyst may be impregnated in a microporous layer deposited on the top of one or more intermediate layers disposed on the external side of the macroporous tubular substrate. In another example, a single tubular inorganic membrane may alternatively be used in lieu of a bundle of tubular inorganic membranes. In some instances, a bundle of tubular inorganic membranes may include up to about 100 tubular inorganic membranes or more depending on the amount of gas to be processed. In some instances, several bundles of tubular inorganic membranes may be used in parallel or in series depending on the amount of gas to be processed.

In some embodiments, the gas may be a landfill gas or a biogas and comprising of methane, carbon dioxide, nitrogen, oxygen, and gas phase contaminants (e.g., NMOC like halogen-containing compounds and sulfur-containing compounds).

In some embodiments, the gas may be a breathing air and comprise air and gas phase contaminants (e.g., chemical warfare agents like sarin (GB), cyanogen chloride (CK), tabun (GA), and the like).

Exemplary materials that may be suitable for forming the microporous layer may include, but are not limited to, alumina, zirconia, titania, silicon carbide, silicon oxycarbide, and the like.

In some embodiments, a microporous layer of a tubular inorganic membrane may have a thickness of about 1 micron to about 10 microns, including any subset therebetween. Thickness of the microporous layer may be measured by scanning electron microscopy.

In some embodiments, a microporous layer of a tubular inorganic membrane may have a porosity of about 25% to about 50%, including any subset therebetween. Porosity of the microporous layer may be measured by $N_2$ adsorption with BET analysis or Helium pychnometry or via the Archimedes method.

In some embodiments, a microporous layer of a tubular inorganic membrane may have an average pore size of about 4 nm to about 50 nm, including any subset therebetween. Pore size of the microporous layer may be measured by flow perporometry and $N_2$ adsorption with BET analysis.

Exemplary oxidative catalysts may include, but are not limited to, platinum, palladium, rhodium, copper oxide, manganese oxide, chromium oxide, vanadia, zirconia, alumina and the like, and any combination thereof.

In some embodiments, an oxidative catalyst layer of a tubular inorganic membrane may be a thin film (continuous or discontinuous) having a thickness of about 1 micron to about 10 microns, including any subset therebetween.

Thickness of the oxidative catalyst layer may be measured by scanning electron microscopy.

In some embodiments, an oxidative catalyst layer of a tubular inorganic membrane may include particles of the oxidative catalyst (as a film or impregnated in the microporous layer), where the particles have an average diameter of about 1 nm to about 10 nm, including any subset therebetween. Diameters of the oxidative catalyst particles may be determined by imaging and measuring the particle sizes with transmission electron microscopy or by CO chemisorption.

Exemplary materials that may be suitable for forming the macroporous tubular substrate include, but are not limited to, alumina, zirconia, titania, silicon carbide, silicon oxycarbide, and the like.

In some instances, the tubular inorganic membranes may be heated to temperatures of about 150° C. to about 300° C., including any subset therebetween, to facilitate the catalytic reaction. In some instances, the temperature may be chosen so as to mitigate reaction between methane and the oxidative catalyst.

In some instances, the reaction between NMOC in a landfill or biogas and the oxidative catalyst may produce acidic products. Acids have been shown to poison (or at least partially deactivate) some catalysts. However, because of the gas flow through the tubular inorganic membranes and the thickness of the oxidative catalyst layer, it is believed that the gas flow may facilitate movement of the acidic products away from the oxidative catalysts, which may improve the life-time of the catalytic membrane reactor.

The gas may be flown through the catalytic membrane reactor at a flow rate suitable to the situation. Preferably, the gas flow rate may be such that the gas flow is substantially in a Knudsen flow regime (e.g., at least about 50% of the gas flowing in that regime or at least about 75% or at least about 90%). A Knudsen flow regime may, in some instances, favor collisions between gas molecules and a surface of a porous structure (e.g., where the oxidative catalysts reside) over gas-gas molecule collisions. Thus, even with an oxidative catalyst layer that is microns thick, the gas phase contaminants may sufficiently contact catalysts and react. The flow regime of the gas may be determined by modeling the gas flow based on the pressure drop across the membrane and the membrane properties (e.g., porosity, permeability, etc.).

Additionally, because of the porous nature of the tubular inorganic membranes, a catalytic membrane reactor may, in some instances, be operated at a pressure drop across the membranes of about 2 inches of water to about 4.5 inches of water. This may mitigate the need for and cost of additional equipment like compressors, which may be used in conjunction with adsorption beds for removal of gas phase contaminants.

In some instances, the systems and methods described herein may utilize more than one catalytic membrane reactor in series, in parallel, or both.

A catalytic membrane reactor was produced with one tubular inorganic membrane for lab-scale testing. The tubular inorganic membranes utilized in various experiments included an alpha-$Al_2O_3$ macroporous substrate with the one or more additional layers (e.g., catalyst or microporous layers) deposited on the bore side of the substrate either by slip-casting or by sol-gel techniques. Prior to their use, the membranes were analyzed (i) for their pore structure characteristics with techniques like $N_2$ adsorption (BET), flow perporometry for their pore size distribution, and scanning/transmission electron microscopies. Additionally, He and Ar permeation measurements were used to determine the membrane's ability to deliver the desired Knudsen flow characteristics. A platinum precursor was selected in this feasibility-type study to render the membranes catalytic active for reaction with halogenated compounds. The preparation conditions may be used to control average crystallite size of the platinum nanocatalysts, which may be determined by CO chemisorption and transmission electron microscopy.

Figure 2:
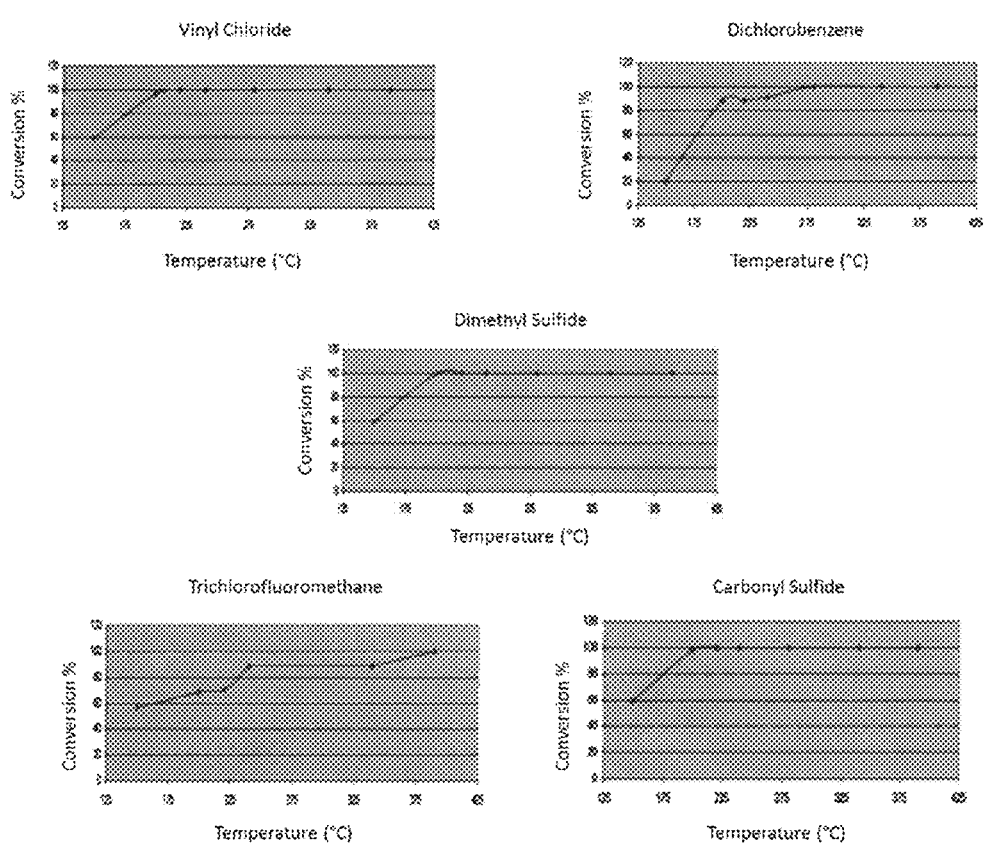
FIG. 2 provides percent conversion values of NMOC in a simulated landfill gas as a function of temperature processed by a catalytic membrane reactor according to at least one embodiment described herein.

For the current study a simulated landfill gas was utilized with the composition ($CH_4:CO_2:N_2:O_2=52\%:38\%:9\%:1\%$) containing five model NMOC (1,3-dichlorobenzene (DCB), 5 ppm; trichlorofluoromethane (TCFM), 50 ppm; carbonyl sulfide (COS), 50 ppm; dimethyl sulfide (DMS), 50 ppm; vinyl chloride (VCM), 50 ppm). Prior to investigating the activity of the catalytic membranes, "blank" tests were used to study the activity of the SS reactor wall, which was shown unreactive; for the "virgin" membranes (without catalyst) some adsorption occurred, however, the capacity saturated rather quickly, typically within 10-12 hrs. Once these tests were completed, we studied the ability of the catalytic membrane reactor to remove the NMOC in the landfill gas. Long duration studies were carried out to test the catalytic membrane reactor's ability to function stably at these conditions. FIG. 2 provides percent conversion values of NMOC in a simulated landfill gas as a function of temperature processed by a catalytic membrane reactor according to at least one embodiment described herein. Each data point in FIG. 2 represents at least 12 hrs on line, during which period the conversion remained constant). As shown in FIG. 2, the catalytic membrane reactor was effective. The light-off T is low and complete conversion is attained for all NMOC. For COS and DMS, complete conversion occurs for <200° C. VCM also readily decomposes, and complete conversion occurs for T <220° C. DCB also completely disappears for T<280° C. As expected, the most recalcitrant NMOC is TCFM, but even here large destruction efficiencies (about 90%) are observed even for T<250° C.

In some instances, the systems and methods described herein may utilize additional reactors upstream, downstream, or both of a catalytic membrane reactor. In some embodiments, such systems and methods may be configured for continuous processing of a gas for reducing a concentration of gas phase contaminants therein.

Figure 3:
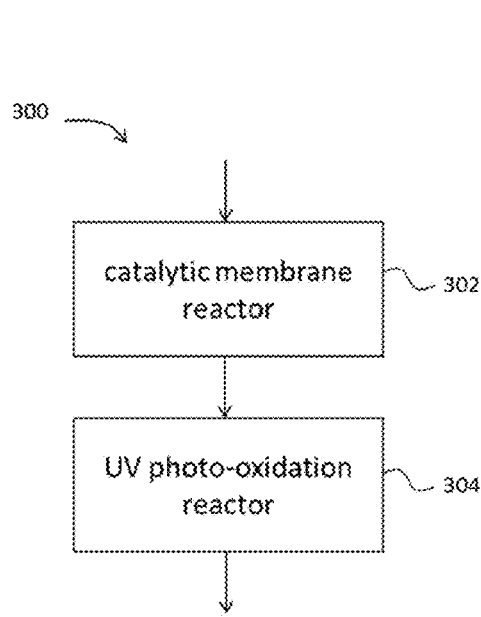
FIG. 3 illustrates a flow diagram of a system suitable for catalytic removal of gas phase contaminants according to at least some embodiments described herein.

FIG. 3 illustrates a flow diagram of a system 300 suitable for catalytic removal of gas phase contaminants according to at least some embodiments described herein. The system 300 includes a catalytic membrane reactor 302 upstream of a UV photo-oxidation reactor 304.

Figure 4:
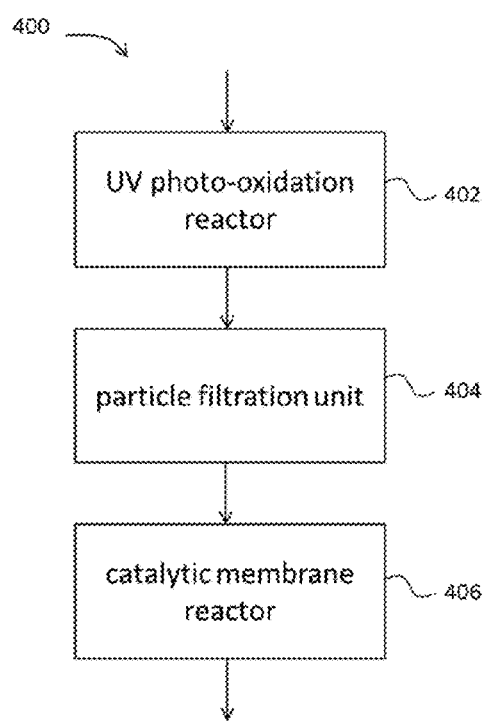
FIG. 4 illustrates a flow diagram of a system suitable for catalytic removal of gas phase contaminants according to at least some embodiments described herein.

FIG. 4 illustrates a flow diagram of a system 400 suitable for catalytic removal of gas phase contaminants according to at least some embodiments described herein. The system 400 includes a UV photo-oxidation reactor 402 upstream of a particle filtration unit 404, which is upstream of a catalytic membrane reactor 406.

A UV photo-oxidation reactor described herein may be configured to irradiate gas flowing through or otherwise contained within a flow path with UV light from a UV source (e.g., a UV bulb, a UV light emitting diode, a UV lamp, a fluorescent UV source, or a combination thereof). In operation, the UV light may interact with at least some of the siloxane gas phase contaminates and cause the siloxanes to react to form silica particles. In some instances, a particle filtration unit may be located downstream of the UV photo-oxidation reactor so as to remove the silica particles from the gas.

Figure 5:
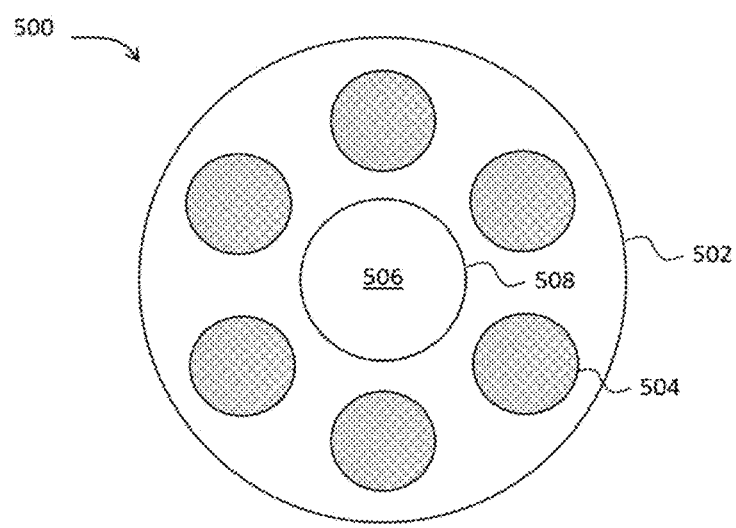
FIG. 5 illustrates a cross-sectional diagram of an exemplary UV photo-oxidation reactor.

FIG. 5 illustrates a cross-sectional diagram of an exemplary UV photo-oxidation reactor 500. The UV photo-oxidation reactor 500 includes a housing 502 containing UV sources 504 and a flow path 506 defined by a UV-transparent tubular 508. In some alternative embodiments, the housing may define the flow path, and the UV-transparent tubular may be excluded. In alternative embodiments UV photooxidation reactor design may be dictated by line-of-sight considerations including the use of reflective coatings.

Exemplary particle filtration units may include wet filtration processes or dry filtration processes (e.g., HEPA filters).

In laboratory testing, a UV photo-oxidation reactor configured similar to that of FIG. 5 was used in a system similar to that of FIG. 4. The catalytic membrane reactor included a single tubular inorganic membrane as described above. The particle filtration unit was a water filter. In these studies with simulated biogas containing various siloxanes (e.g., hexamethyldisiloxane ($L_2$), octamethylcyclotetrasiloxane ($D_4$), and the like), the UV photo-oxidation reactor substantially decomposed (>95% removal rate attained in our experiments, for siloxane levels typical in biogas, i.e., <50 mg/$m^3$) the siloxanes to convert them into innocuous gas products (e.g., $CO_2$ and water) and silica ($SiO_2$) microparticles with little to no effect on biogas quality.

Figure 6:
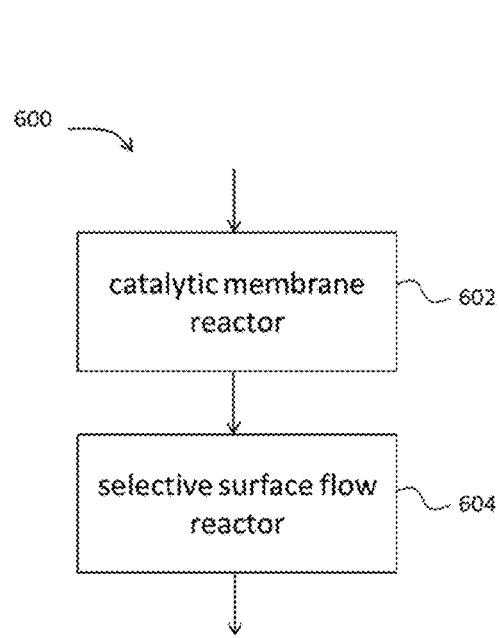
FIG. 6 illustrates a flow diagram of a system suitable for catalytic removal of gas phase contaminants according to at least some embodiments described herein.

FIG. 6 illustrates a flow diagram of a system 600 suitable for catalytic removal of gas phase contaminants according to at least some embodiments described herein. The system 600 includes a catalytic membrane reactor 602 upstream of a selective surface flow reactor 604.

Figure 7:
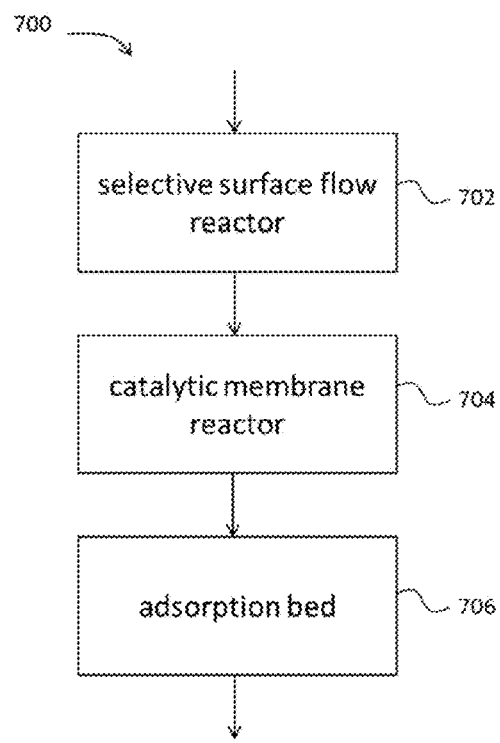
FIG. 7 illustrates a flow diagram of a system suitable for catalytic removal of gas phase contaminants according to at least some embodiments described herein.

FIG. 7 illustrates a flow diagram of a system 700 suitable for catalytic removal of gas phase contaminants according to at least some embodiments described herein. The system 700 includes a selective surface flow reactor 702 upstream of a catalytic membrane reactor 704 and an adsorption bed 706 downstream of both the selective surface flow reactor 702 and the catalytic membrane reactor 704.

Selective surface flow reactors may include selective surface flow membranes (SSFM) useful in condensing gas phase contaminants in the pores of the membrane. In some instances, when used upstream of a catalytic membrane reactor, the selective surface flow reactor may be useful in reducing the concentration of at least some of the gas phase contaminants in the gas (e.g., chemical warfare agents and NMOC). In some instances, when used downstream of a catalytic membrane reactor, the selective surface flow reactor may be useful in reducing the concentration of at least some of the gas phase contaminants native to the gas an may have traversed the catalytic membrane reactor intact or gas phase contaminants added to the gas during catalytic oxidation (e.g., byproducts of catalytic oxidation of chemical warfare agents).

In some instances, selective surface flow membranes may include nanoporous films (1-10 micron thick), 20-50% in porosity, 0.4 nm-4 nm pore size, deposited on one or more porous intermediate layers deposited on a tubular macroporous support. Exemplary materials that may be suitable for forming the macroporous tubular substrate include, but are not limited to, alumina, zirconia, titania, silicon carbide, silicon oxycarbide and the like. Exemplary materials that may be suitable for forming the nanoporous top films include, but are not limited to, silica, zirconia, titania, carbon molecular sieves, silicon carbide, silicon oxycarbide, zeolites, and the like.

Adsorption beds may be included anywhere along the systems described herein including upstream, downstream, or both of a catalytic membrane reactor. Exemplary adsorption bed may include materials like activated carbon, zeolites, molecular sieves, and combinations thereof.

In some embodiments, a system may include any combination of catalytic membrane reactor(s), a selective surface flow reactor(s), an adsorption bed(s), and a UV photo-oxidation reactor(s). Systems described herein may include additional components useful in implementing the methods described herein. Examples of such components may include, but are not limited to, acid sorbers, heaters, coolers, heat exchangers, compressors, valves, gas flow controllers, analytical instruments or sensors (e.g., for testing the concentration of gas phase contaminants), containers for collecting the gas after purification, and the like, and combinations thereof.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system comprising:
a catalytic membrane reactor comprising a heating element in thermal communication with a bundle of tubular inorganic membranes and a housing having a gas inlet and a gas outlet and containing the bundle of tubular inorganic membranes, wherein the catalytic membrane reactor is configured such that, when in operation to catalytically remove gas phase contaminants from a gas, the gas flows, in order, into the housing through the gas inlet, into a bore of the tubular inorganic membranes, through a wall of the tubular inorganic membranes, and out of the housing through the gas outlet, wherein each of the tubular inorganic membranes comprise a macroporous tubular substrate with an oxidative catalyst and a microporous layer disposed on a bore side of the macroporous tubular substrate.

2. The system of claim 1, wherein the oxidative catalyst is impregnated in the microporous layer.

3. The system of claim 1, wherein the oxidative catalyst is in a layer disposed between the microporous layer and the macroporous tubular substrate.

4. The system of claim 1, wherein the microporous layer has a thickness of about 1 micron to about 10 microns.

5. The system of claim 1, wherein the microporous layer has a porosity of about 25% to about 50%.

6. The system of claim 1, wherein the microporous layer has an average pore size of about 4 nm to about 50 nm.

7. The system of claim 1 further comprising:
an adsorption bed upstream or downstream of the catalytic membrane reactor.

8. The system of claim 1 further comprising:
a photo-oxidation reactor upstream or downstream of the catalytic membrane reactor, the photo-oxidation reactor comprising a gas flow path and UV source arranged relative to the gas flow path to allow for UV irradiation of a gas contained in the gas flow path.

9. The system of claim 8 further comprising:
a particle filtration unit disposed downstream of the photo-oxidation reactor.

10. The system of claim 1 further comprising:
a selective surface flow reactor upstream or downstream of the catalytic membrane reactor.

11. The system of claim 10 further comprising:
an adsorption bed downstream of the catalytic membrane reactor and the selective surface flow reactor.

* * * * *